United States Patent [19]

Isobe et al.

[11] Patent Number: 5,088,586

[45] Date of Patent: Feb. 18, 1992

[54] AUTOMATIC RENTING APPARATUS

[75] Inventors: Minoru Isobe; Haruo Kimura; Shin-ichi Suto, all of Tokyo, Japan

[73] Assignee: Oki Electric Industry Co., Ltd., Tokyo, Japan

[21] Appl. No.: 189,168

[22] Filed: May 2, 1988

[30] Foreign Application Priority Data

Apr. 30, 1987 [JP] Japan .................. 62-107171

[51] Int. Cl.$^5$ ............................. G07F 11/02
[52] U.S. Cl. ............................. 194/205; 364/403; 364/407; 364/479
[58] Field of Search ............... 194/205, 212; 364/403, 364/404, 407, 479

[56] References Cited

U.S. PATENT DOCUMENTS 4,458,802  7/1984  Maciver et al. .
4,752,876  6/1988  Couch et al. ................ 364/479 X

FOREIGN PATENT DOCUMENTS

86/02758  5/1986  World Int. Prop. O. ............ 221/88

Primary Examiner—F. J. Bartuska
Attorney, Agent, or Firm—Wenderoth, Lind & Ponack

[57] ABSTRACT

An automatic renting apparatus is for automatically renting rental articles and restoring returned rental articles. The automatic renting apparatus stores information concerning rental articles that have been rented out, rental articles to supplement or replace the stock, and the scheduled date of replacement or supplement. When the patron subscribes in advance for a rental article, information is displayed on a display unit to enable the patron to select a desired rental article for which the patron desires to make advance subscription. Upon the selection of the desired rental article and a desired renting date by the patron, information concerning the desired rental article and the desired renting date is stored in a subscription information storage unit.

3 Claims, 6 Drawing Sheets

Fig. 2

| | | |
|---|---|---|
| RENTAL HISTORY INFORMATION | FREQUENCY OF MISRETURN | |
| | NUMBER OF RENTED ARTICLE | |
| | FREQUENCY OF DELAYED RETURN | |
| RENTING/SUBSCRIPTION INFORMATION | RENTING TERM | |
| | RENTING TERM | |
| | RENTED ARTICLE NUMBER | |
| | RENTED ARTICLE NUMBER | |
| | APPARATUS NUMBER | |
| TERM OF VALIDITY | | |
| MEMBERSHIP INFORMATION | NAME | |
| | ATTRIBUTES | |
| | MEMBERSHIP NUMBER | |
| | SHOP NUMBER | |
| ITEM | | |

Fig. 4

| | | | |
|---|---|---|---|
| 1 | ARTICLE NUMBER | UPPER | 9 8 |
| | | LOWER | 7 6 |
| | RENTING DATE INFORMATION | YEAR | 8 6 |
| | | MONTH | 1 1 |
| | | DATE | 0 1 |
| | MEMBERSHIP INFORMATION | UPPER | 1 2 |
| | | ⟩ | 3 4 |
| | | | 5 6 |
| | | LOWER | 7 8 |
| 2 | ARTICLE NUMBER | UPPER | 9 8 |
| | | LOWER | 7 5 |
| | RENTING DATE INFORMATION | YEAR | 8 6 |
| | | MONTH | 1 1 |
| | | DATE | 0 2 |
| | MEMBERSHIP INFORMATION | UPPER | 2 3 |
| | | ⟩ | 4 5 |
| | | | 6 7 |
| | | LOWER | 8 9 |
| 3 | ARTICLE NUMBER | UPPER | 9 8 |
| | | LOWER | 7 4 |
| | RENTING DATE INFORMATION | YEAR | 8 6 |
| | | MONTH | 1 1 |
| | | DATE | 0 3 |
| | MEMBERSHIP INFORMATION | UPPER | 3 4 |
| | | ⟩ | 5 6 |
| | | | 7 8 |
| | | LOWER | 9 0 |
| | ARTICLE NUMBER | UPPER | 9 8 |
| | | LOWER | 7 3 |
| | RENTING | YEAR | 8 6 |

Fig. 5

| | | | |
|---|---|---|---|
| 1 | ARTICLE NUMBER | UPPER | 9 8 |
| | | LOWER | 7 6 |
| | SCHEDULED RENTING DATE | YEAR | 8 6 |
| | | MONTH | 1 1 |
| | | DATE | 1 0 |
| | MEMBERSHIP INFORMATION | UPPER | 4 5 |
| | | ⌇ | 6 7 |
| | | | 8 9 |
| | | LOWER | 0 1 |
| 2 | ARTICLE NUMBER | UPPER | 9 8 |
| | | LOWER | 7 2 |
| | SCHEDULED RENTING DATE | YEAR | 8 6 |
| | | MONTH | 1 1 |
| | | DATE | 1 1 |
| | MEMBERSHIP INFORMATION | UPPER | 5 6 |
| | | ⌇ | 7 8 |
| | | | 9 0 |
| | | LOWER | 1 2 |
| 3 | ARTICLE NUMBER | UPPER | 9 8 |
| | | LOWER | 7 1 |
| | SCHEDULED RENTING DATE | YEAR | 8 6 |
| | | MONTH | 1 1 |
| | | DATE | 1 2 |
| | MEMBERSHIP INFORMATION | UPPER | 6 7 |
| | | ⌇ | 8 9 |
| | | | 0 1 |
| | | LOWER | 2 3 |
| | ARTICLE NUMBER | UPPER | 9 8 |
| | | LOWER | 7 0 |
| | SCHEDULED | YEAR | 8 6 |

AUTOMATIC RENTING APPARATUS

BACKGROUND OF THE INVENTION

1. Field of the Invention

The present invention relates to an automatic renting apparatus for automatically renting rental articles.

2. Description of the Prior Art

Rental systems have diffused nowadays and many desired industrial commodities are available for rent. Rental articles are rented for remuneration equivalent to the value and rental term of the same and are returned upon the expiration of the rental term.

Rental articles include records, clothes and automobiles. The progressive diffusion of video tape recorders for domestic uses in recent years has caused a remarkable expansion in the demand for movie video tapes. Generally, the rental business for renting rental articles to renters requires personal services in renting rental articles. However, automatic renting apparatus capable of providing automatic renting services have diffused in the rental business in recent years to carry out renting work quickly and to expand the rental business market. U.S. Pat. No. 4,458,802 to Maciver et.al. discloses such an automatic renting apparatus, which automatically performs procedures for renting articles and storing rental articles returned from renters on the basis of information recorded in cards previously issued to registered patrons. However, patrons are unable to rent articles presently rented out. Furthermore, the rental articles stored in such an automatic renting apparatus include those which are not rented frequently and those which have been worn by frequent use by renters. Accordingly, some of the stock of rental articles are replaced periodically with new ones or changed for other rental articles to improve the operating efficiency of the rental articles and to improve services to patrons. However, the patrons are unable to know previously new rental articles added to the stock for periodic replacement of the rental articles. Accordingly, patrons have been unable to subscribe in advance for rental articles before the replacement of the rental articles.

SUMMARY OF THE INVENTION

Accordingly, it is an object of the present invention to provide an automatic renting apparatus capable of accepting advance subscription for rental articles presently rented out.

It is another object of the present invention to provide an automatic renting apparatus capable of accepting advance subscription for rental articles which have not yet been kept in stock, namely, rental articles which will shortly be added to the stock.

The above and other objects, features and advantages of the present invention will become more apparent from the following description taken in conjunction with the accompanying drawings.

BRIEF DESCRIPTION OF THE DRAWINGS

FIG. 2 is an illustration of the information format of a card issued to a registered patron;

FIG. 4 is an illustration of a format of records stored in the rental information storage unit of the automatic renting apparatus of FIG. 3;

FIG. 5 is an illustration of a format of records stored in the subscription information storage unit of the automatic renting apparatus of FIG. 3.

DESCRIPTION OF THE PREFERRED EMBODIMENT

A card issued to a registered patron (hereinafter referred to as "a membership card") for use on an automatic renting apparatus of the present invention is a magnetic card or an IC (integrated circuit) card in which information can magnetically or electrically be written and erased. The information written in the membership card includes (1) a shop number representing the shop from which the a membership card was issued, (2) membership number, (3) attributes of the member such as the date of birth and age of the member, (4) the name of the member, (5) the term of the validity of the membership card, (6) an apparatus number, (7) a rental article number including information for advance subscription, (8) a rental term, (9) the frequency of delayed return, (10) the number of rented articles and (11) the number of misreturn. These items of the information are written individually.

Figure 1:
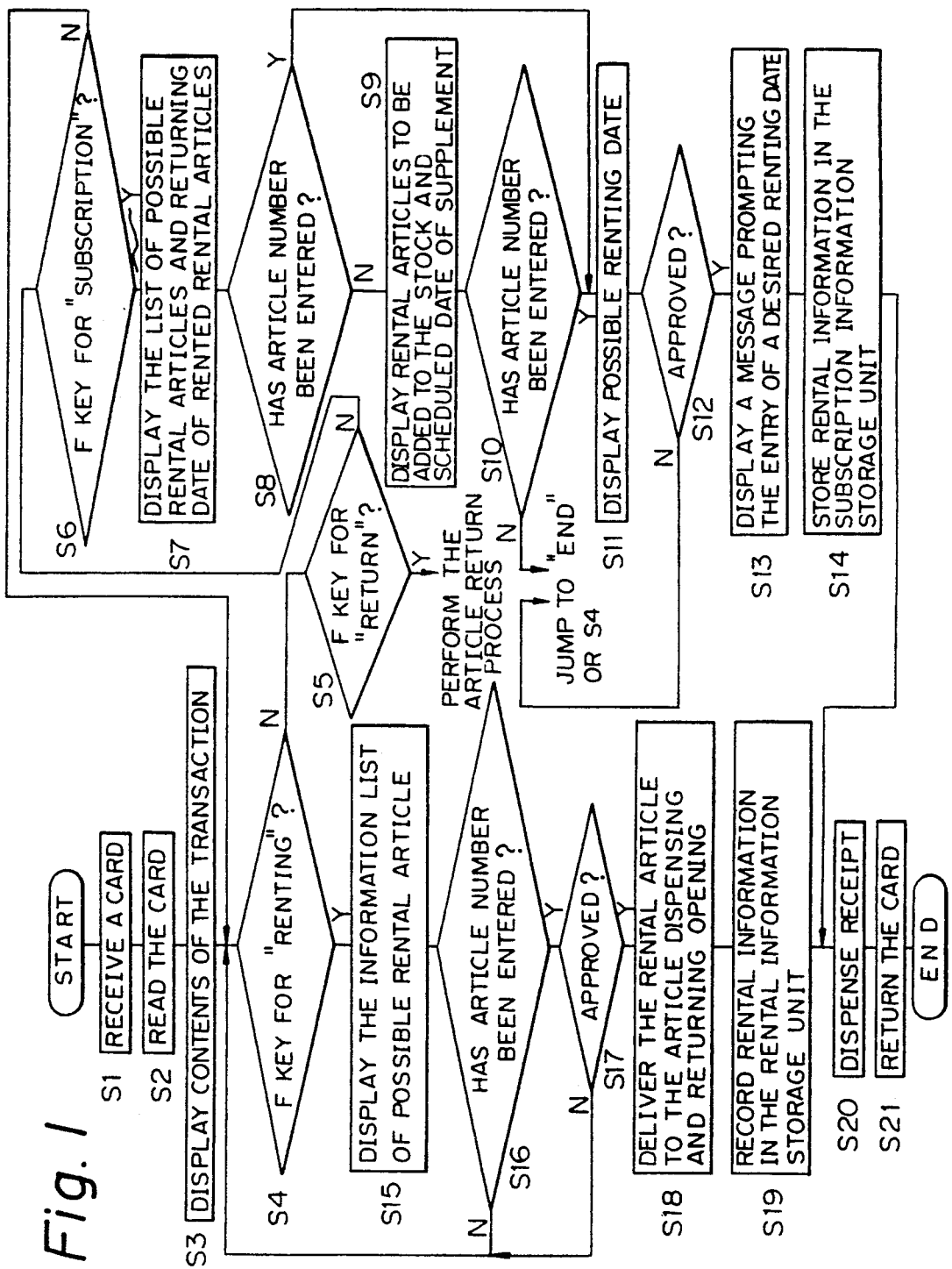
FIG. 1 is a flow chart showing the operation steps of an automatic renting apparatus, in a preferred embodiment, according to the present invention, in response to an advance subscription for a commodity.
Figure 3:
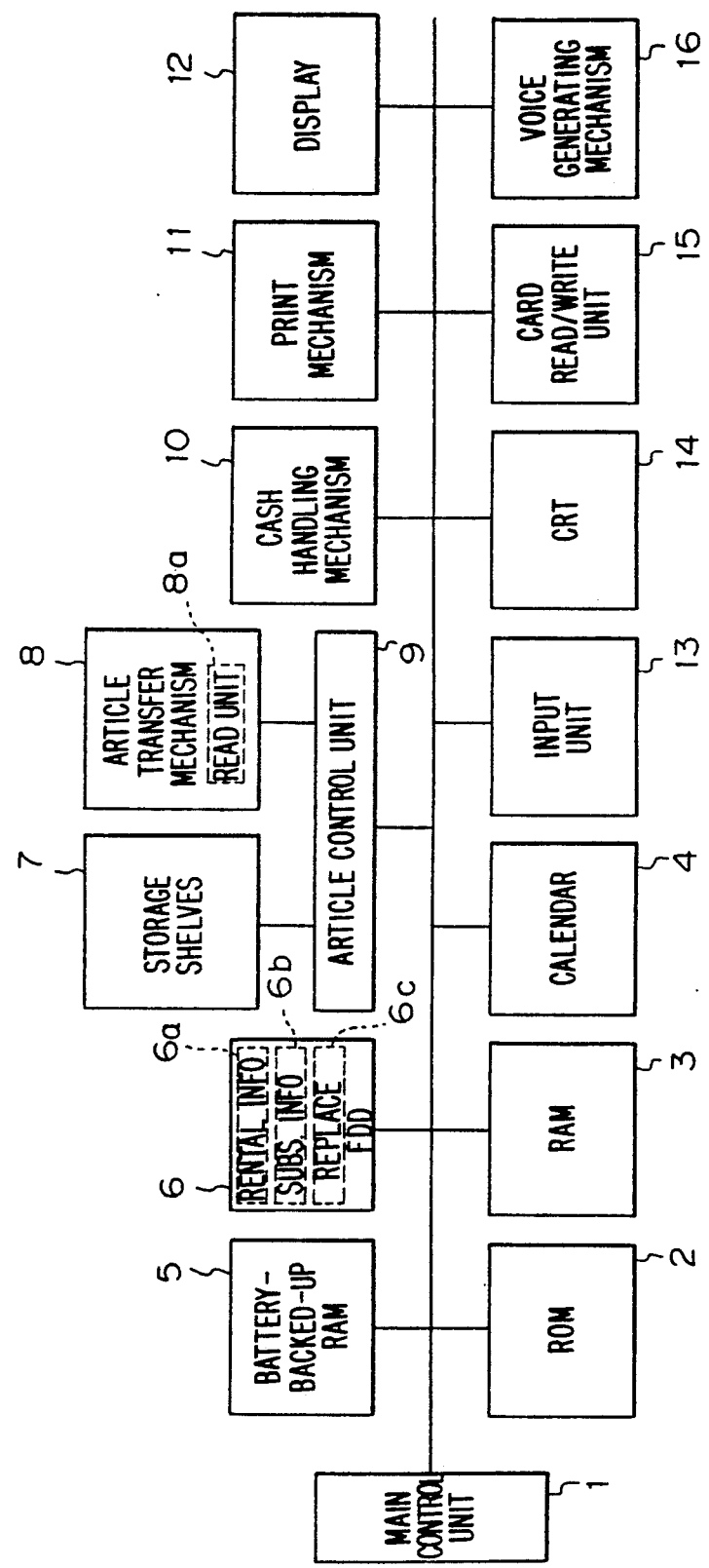
FIG. 3 is a block diagram showing the functional components of an automatic renting apparatus embodying the present invention.

Referring to FIG. 3 showing the principal components of an automatic renting apparatus embodying the present invention, there are shown a main control unit 1, a readonly memory (hereinafter abbreviated to "ROM") 2 for storing control programs, a random access memory (hereinafter abbreviated to "RAM") 3 for temporarily storing input data, a calendar 4 for providing the actual date and hour, a battery-backed-up 5 RAM for securing necessary data in case the automatic renting apparatus is disconnected accidentally from a power supply, a flexible disk drive (hereinafter abbreviated to "FDD") 6 for storing information concerning the stock position and stock condition of articles stored in the storage shelves and information concerning patrons, storage shelves 7 for storing rental articles such as video tape cassettes, an article transfer mechanism 8 for transferring the rental articles between the storage shelves and an article dispensing and returning opening, an article control unit 9 for controlling the storage shelves 7 and the article transfer mechanism 8, a cash handling mechanism 10 for counting cash deposited by patrons, storing the cash and paying change, a print mechanism 11 for printing the contents of a transaction on a receipt when renting and recovering rental articles, an operation guidance display 12 for displaying guidance instructions to the patrons for operating the automatic renting apparatus when renting and returning rental articles, an input unit 13 which is operated by patrons to give information to the automatic renting apparatus when renting and returning rental articles, a display unit (hereinafter referred to as "CRT") 14 concerning the displaying instructions for operation and information about rental articles in messages and patterns for guidance, a card read/write unit (hereinafter referred to as "card R/W unit") 15 for reading information from and writing information in a card, and a voice generating mechanism 16 which generates speeches corresponding to the messages displayed on the CRT 14.

Information entered by operating the input unit 13 and data read by the card R/W unit 15 are stored temporarily in the RAM 3. The calendar 4 is also backed up by the backup battery of the battery-backed-up RAM 5. A rental information storage unit 6a and an advance subscription information storage unit 6b, which will be described later with reference to FIGS. 4 and 5, are included in either the FDD 6 or the battery-backed-up RAM 5, or in both the FDD 6 and the battery-backed-up RAM 5. In this embodiment, the rental information storage unit 6a and the advance subscription information storage unit 6b are included in the FDD 6. The FDD 6 includes a replacement schedule storage unit 6c for storing information such as data concerning the articles for supplementing the stock in the near future and the date of replacement in a recording medium. The article transfer mechanism 8 is provided with a read unit 8a for reading identification codes, such as bar codes, attached to rental articles.

FIG. 4 is a rental information format in the rental information storage unit 6a of the FDD 6. The rental information storage unit 6a has a plurality of areas for storing the article number, the renting date and membership information about the members. Article numbers of articles rented to renters, date of renting articles to renters and membership numbers of renters are written respectively in the areas for article number, for renting date and for membership information to specify renters, articles and renting date.

FIG. 5 is an information format in the advance subscription information storage unit 6b. The advance subscription information storage unit 6b has a plurality of areas for storing article numbers, renting date information and membership information. Article numbers, renting date information and membership information are written in those areas to specify the date on which the article is to be rented and the patron who has subscribed in advance for the article.

Figure 6:
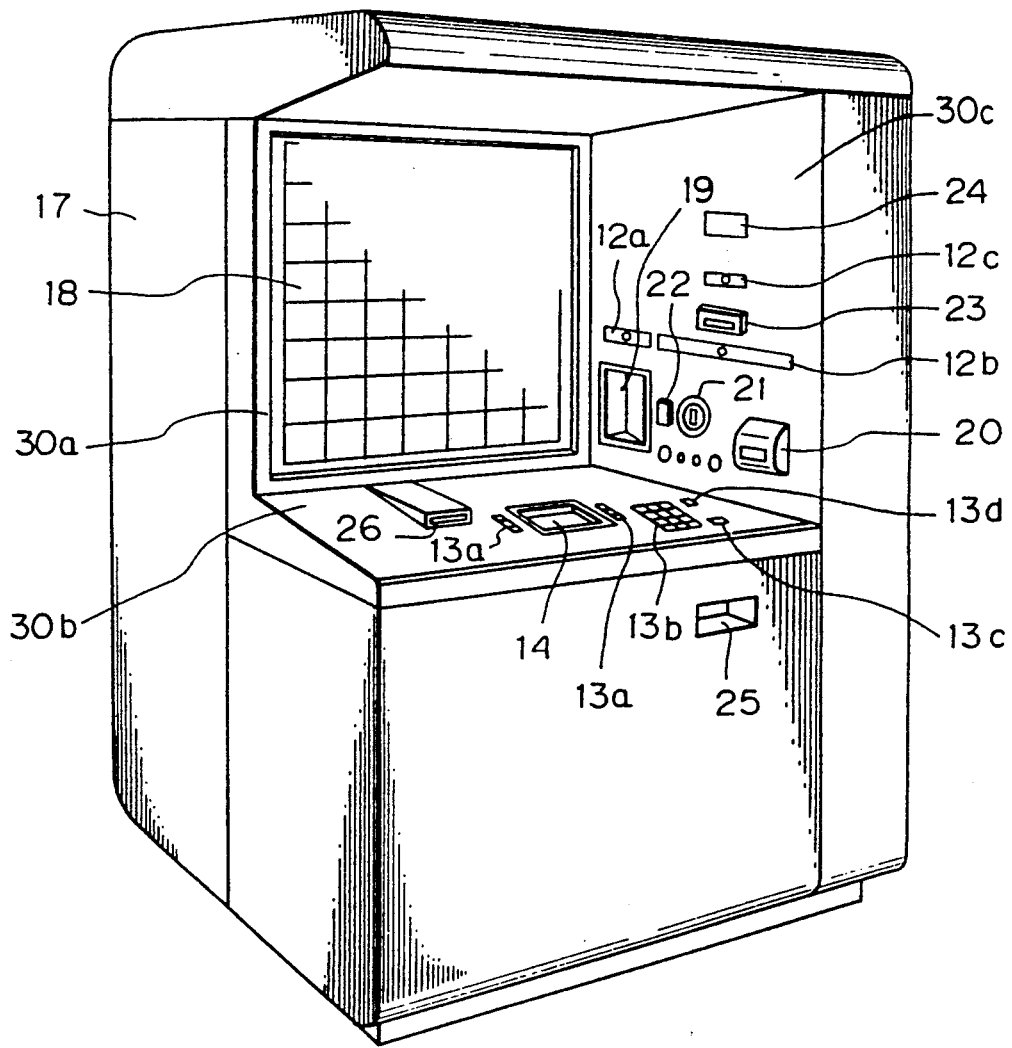
FIG. 6 is a perspective view showing the external appearance of the automatic renting apparatus of FIG. 3.

As shown, in FIG. 6, the automatic renting apparatus has a housing 17 for housing the components of the automatic renting apparatus, and a patron operation section is defined by a front panel 30a, an operating panel 30b and a side panel 30c in the upper section of the housing 17. An article information board 18 indicating the name and article numbers of articles which are frequently rented is provided on the front panel 30a. Provided on the side panel 30c are an article dispensing and returning opening 19 for dispensing a rental article therethrough and receiving a rental article returned by a renter, a bank note inlet 20 for receiving bank notes deposited by a renter, a coin inlet 21 for receiving coins deposited by a renter, a coin refund button 22 which is operated by a patron to request the refund of coins, a card inlet 23 for inserting the membership card in the card R/W unit 15, an operation guidance display 12 having pilot lamps 12a, 12b and 12c, and an indicator 24 which indicates whether the automatic renting apparatus is operative or whether the same is inoperative.

An article dispensing opening and an article returning opening may be provided separately instead of the single article dispensing and returning opening 19.

Provided on the operating panel 30b of the patron operation section are a receipt dispensing opening 26 for dispensing a receipt printed by the print mechanism 11, the CRT 14, function keys (hereinafter referred to as "F keys") 13a of the input unit 13, and information input keys including numeric keys 13b, a confirmation key 3c and a cancellation key 13d.

A coin dispensing opening 25 is formed in the housing 17 to dispense change.

The operation of the automatic renting apparatus will be described hereinafter with reference to FIGS. 1 through 6.

Although the respective operations of the component units are controlled by the main control unit 1 according to control programs stored in the ROM 2, the description of the control program read operation of the main control unit 1 will be omitted for simplicity. Furthermore, the respective operations of the cash handling mechanism 10, the operation guidance unit 12 having the pilot lamps 12a, 12b and 12c, and the voice generating mechanism will also be omitted for simplicity.

In the following description of the operation of the automatic renting apparatus, the steps of the operation will each be represented by a combination of a letter "S" and a numeral.

S1: A membership card inserted by a patron in the card inlet 23 is taken into the automatic renting apparatus.

S2: Upon the detection of the insertion of the membership card by a card detector, not shown, the main control unit 1 gives a card information read instruction to the cart R/W unit 15. Then, the card R/W unit 15 reads information written in the membership card. The information read by the card R/W unit 15 is transferred through the main control unit 1 to the RAM 13 to store the information in the RAM 13. The main control unit 1 decides, on the basis of the read information, whether or not the membership card is valid. When the membership card is valid, the procedure goes to step S3. When the membership card is void, the membership card is not accepted and is returned through the card inlet 23 to the patron. The main control unit 1 also decides, on the basis of the read information, whether or not the validity term of the membership card has expired. If the validity term of the membership card has expired, the main control unit 1 instructs the validity patron to renew the term of the membership card by paying a subscriber fee (membership fee). However, the procedure for the renewal of the validity term of the membership card is not related directly with the present invention, and hence the description thereof will be omitted and the description will be made on an assumption that all the membership cards are valid.

S3: The main control unit 1 instructs the CRT 14 to display massages giving guidance to the patron as to the selection of the content of transaction. Words "RENTING", "RETURN" and "SUBSCRIPTION" corresponding to the F keys 13a also are displayed on the CRT 14.

S4: The main control unit 1 makes a decision as to whether or not the F key 13a corresponding to "RENTING" is pressed. When the decision is affirmative, the program goes to step S13 and, when negative, the program returns to step S1.

S5: The main control unit 1 makes a decision as to whether or not the F key 13a corresponding to "RETURN" is pressed. When the decision is negative, the program goes to step S6 and, when the decision is affirmative, the article return process is performed. When the patron puts the rental article in the article dispensing and returning opening 19 to return the article, the read unit 8a of the article transfer mechanism reads the identification code of the rental article. The renting date information and membership information stored in the rental information storage unit 6a for the article restored to the automatic renting apparatus are erased and, at the same time, the rental article number and the renting term of the restored article among the information concerning the renting and subscription written in the membership card are erased. Then, the membership card is returned to the patron through the card inlet 23 and a receipt carrying the contents of transaction printed by the print mechanism 11 is dispensed through the receipt dispensing opening 26.

S6: The main control unit 1 makes a decision as to whether or not the F key 13a corresponding to "SUBSCRIPTION" is pressed. When the same F key 13a is pressed, the program goes to step S7 and, when it is not pressed, the program returns to step S4. The loop of steps S4, S5 and S6 is repeated until the F key 13a is pressed.

S7: The article list including the name and number of the articles in stock on the storage shelves 7, and information including the appointed date of return of rental articles are read from the storage medium of the FDD 6 in response to a read instruction provided by the main control unit 1. The information read from the storage medium of the FDD 6 and a message prompting the patron to enter the article number of a desired article are displayed on the CRT 14. If the desired article is found in the article list, the patron is required to enter the article number of the desired article by operating the numeric keys 13b within a fixed period of time.

S8: The main control unit 1 monitors the entry of the article number and time. The program goes to step S11 when the article number is entered within the fixed period of time, and the program goes to step S9 when no article number is entered within the fixed period of time.

S9: The main control unit provides an instruction to read information including the date of the next supplement of the stock and supplemental articles to be added to the stock in the next supplement is read from the replacement schedule storage unit 6c of the FDD 6. Then, the information read from the replacement schedule storage unit 6c and a message prompting the patron to enter the article number of the desired article are displayed on the CRT 14. The patron requested to enter the article number of the desired article by operating the numeric keys 13b within a fixed period of time when the desired article is found in the information.

S10: The main control unit monitors the entry of the article number and time. The program goes to step S11 when the article number is entered within the fixed period of time. When no article number is entered within the fixed period of time, the main control unit 1 gives an instruction to the card R/W unit 15 to return the membership card to the patron. Then, the membership card is returned through the card inlet 23 to the patron, and then the program is ended or the program goes to step S4. The article number entered in steps S8 or S10 is stored in the RAM 3 in combination with the membership information.

S11: The main control unit 1 executes a calculation to determine a possible renting date of the article corresponding to the article number entered by the patron. The possible renting date, the article name and the article number are displayed on the CRT 14 to enable the patron to confirm his order. When the patron approves the possible renting date, the article name and the article number are displayed on the CRT 14, and when the patron wishes to subscribe for the article, the patron presses the confirmation key 13c.

The calculation of the possible renting date follows the following procedure. When the article corresponding to the article number entered by the patron is in stock on the storage shelves 7, the present date is assigned to the possible renting date. When the article is rented, the scheduled return date of the article is determined from the renting date information stored in the rental information storage unit 6a (FIG. 4) on the basis of a predetermined number of renting days, and then spare days for delayed return of the article is added to the scheduled return date to decide the possible renting date. When the article is not in stock and is to be added to the stock in the future, a scheduled replacement date is assigned to the possible renting date. The present date is retrieved from the calendar 4.

S12: The main control unit 1 makes a determined as to whether or not the confirmation key 13c is pressed, namely, whether or not the patron has approved the conditions of the advance subscription. When the patron approves the conditions of advance subscription, the program goes to step S13. When the patron does not approve the conditions of advance subscription, the program returns to step S4 to receive request for renting another article or returns the membership card to the patron to end the program.

S13: A message is displayed on the CRT 14 to prompt the patron to enter a desired renting date by operating the numeric keys 13b when the patron desires to specify a particular renting date. When the numeric keys 13b are not operated to enter the desired renting date, a message expressing that the possible renting date is assigned to the desired renting date is displayed on the CRT 14. When a specific renting date is desired, the operator enters the specific renting date by operating the numeric keys 13b. The desired renting date, as well as the article number for advance subscription, is stored in the RAM 3.

S14: The main control unit 1 reads information including the article number for which advance subscription has been made, the desired renting date and the membership information concerning the patron from the RAM 3 and stores the same information in one of the areas of the battery-backed-up RAM 5 or the subscription information storage unit 6b (FIG. 5) of the FDD 6.

S15: When the F key 13a for "RENTING" is pressed in S4, the main control unit 1 displays the article names and article numbers of the articles in stock on the storage shelves 7 and a message prompting the patron to enter the article number of a desired article on the CRT 14.

S16: The main control unit 1 monitors the entry of the article number and the passage of a fixed time. When the article number is entered within the fixed period of time the program goes to step S17 and, when it is not entered within the fixed period, the program returns to step S4 to receive new advance subscription for another article.

S17: The article number entered by the patron and the corresponding article name are displayed on the CRT 14. When the entry is accomplished correctly, a message prompting the patron to press the confirmation key 13c to approve the indication on the CRT 14 is displayed on the CRT 14. When the confirmation key 13c is pressed, the main control unit 1 determines whether or not the confirmation has been made within the fixed period of time. When the determination is affirmative the program goes to step S18 and, when negative, the program returns to step S4.

S18: The main control unit 1 gives address information indicating the position of the desired article on the storage shelves 7 and a delivery instruction to the article control unit 9. Then, the article control unit controls the article transfer mechanism 8 to retrieve the desired article from a storage position corresponding to the address information on the storage shelves 7 and to deliver the desired article to the article dispensing and returning opening 19 to rent the desired article to the patron. When renting the desired article to the patron, the identification code of the desired article is read by the read unit 8a and is stored in the RAM 3 by the main control unit 1.

S19: Detecting means, not shown, gives a detection signal indicating the detection of the extraction of the dispensed article by the patron to the main control unit 1 to enable the main control unit 1 confirm the renting of the desired article. After the confirmation of the renting of the desired article, information including the article number of the rented article and the membership information concerning the patron are read from the RAM 3 and are recorded together with renting date information provided by the calendar 4 in one of the storage areas of the rental information storage unit 6a.

S20: The main control unit 1 instructs the print mechanism 11 to print the contents of the transaction for the advance subscription or the renting on a receipt and to dispense the receipt through the receipt dispensing opening 26.

S21: The main control unit 1 instructs the card R/W unit 15 to write the information concerning the advance subscription or the renting in the renting/subscription information area and renting history information area of the membership card. Then, the membership card is returned through the card inlet 23 to the patron to end the program.

When the article for which the patron made advance subscription is restored to the storage shelves 7 or the same article is added to the stock, the article is controlled on the basis of the subscription information so that priority is given to the subscriber for renting the same article.

Although the invention has been described with reference to a specific embodiment thereof, the present invention is not limited to such an embodiment in practice and many changes and variations are possible therein.

For example, the renting date information (FIG. 4) stored in the rental information storage unit 6a may be substituted by return date information.

Furthermore, the present invention is applicable to various automatic renting apparatus respectively for renting various articles, such as compact disks and records, which can be rented by the patrons, other than video tape cassettes.

Still further, it is possible to identify the operator of the automatic renting apparatus, namely, the discrimination of the operator of the automatic renting machine as to whether or not the operator is the right bearer of the membership card, and to obviate troubles when the membership card is lost by writing a secret number assigned to the patron and requesting the operator to enter the secret number when operating the automatic renting apparatus.

Although the invention has been described in its preferred form with a certain degree of particularity, it is to be understood that many variations and changes are possible in the invention without departing from the scope thereof.

What is claimed is:

1. An automatic renting apparatus for automatically renting articles and collecting returned articles, said apparatus comprising;
   storage shelves for storing articles to be rented;
   an input operation unit having input keys operable by a patron for entering rental information;
   an information storage means for storing information concerning said articles stored on said storage shelves including storage positions of said articles, and for storing information concerning said patron;
   a rental information storage unit for storing information concerning rented articles;
   a replacement schedule information storage unit for storing information concerning new articles which are scheduled to replace specified articles stored in said storage shelves including dates in which said new articles are scheduled to replace said specified articles in said storage shelves;
   a display unit for displaying guidance instructions for prompting said patron in the operation of said input operation unit, and for displaying said information concerning said new articles when an article selected by said patron is not located in said storage shelves and is not includes in said information concerning said rented articles;
   a subscription information storage unit for storing information concerning articles to be rented in which advance subscriptions have been made, and for storing rental information concerning an advance subscription which has been inputted by said patron in said input operation unit.

2. A method of subscription of rented articles in an automatic renting apparatus which automatically rents articles and collects returned articles, said method comprising the steps of:
   reading information written in a membership card, said membership card being insert into a card dispensing/returning opening of a card read/write unit;
   judging the validity of the membership card on the basis of said information read from said member sip card;
   monitoring input information entered into an input operation unit and displaying on a display unit guidance instructions in response to said input information entered into said input operation unit when said membership card is valid;
   reading rental information concerning rented articles and scheduled dates of return of said rented articles from a rental information storage unit and displaying on said display unit said rental information when said input information indicates that a selected articles has been rented; and
   storing in a subscription information storage unit advance subscription information concerning articles to be rented and scheduled dates in which said articles are to be rented when said advance subscription information is entered into said input operation unit.

3. A method of subscription of rented articles in an automatic renting apparatus which automatically rents articles and collects returned articles, said method comprising the steps of;

- reading information written in a membership card, said membership card being inserted into a card dispensing/returning opening of a card read/write unit;
- judging the validity of said membership card on the basis of said information read from said membership card;
- monitoring input information entered into an input operation unit and displaying on a display unit guidance instructions in response to said input information entered into said input operation unit when said membership card is valid;
- reading rental information concerning new articles which are scheduled to replace specified articles in the apparatus including the scheduled dates in which said new articles are to replace the specified articles in the apparatus from a replacement schedule information storage unit, and displaying on said display unit, said rental information when said input information indicates that a selected article is not in the apparatus and is one of the new articles; and
- storing in a subscription information storage unit advance subscription information concerning articles to be rented and schedules dates in which said articles are to be rented when said advance subscription information is entered into said input operation unit.

* * * * *